June 15, 1943.  C. KACHEL  2,321,820
FISHING REEL
Filed Aug. 30, 1941  2 Sheets-Sheet 1
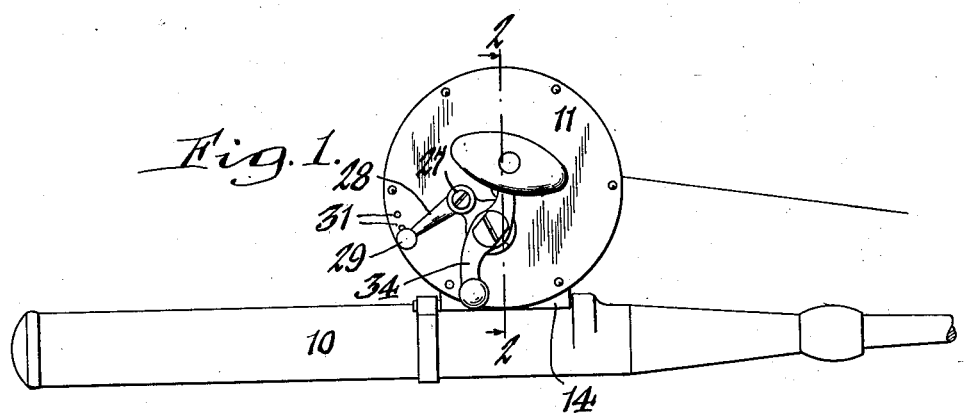
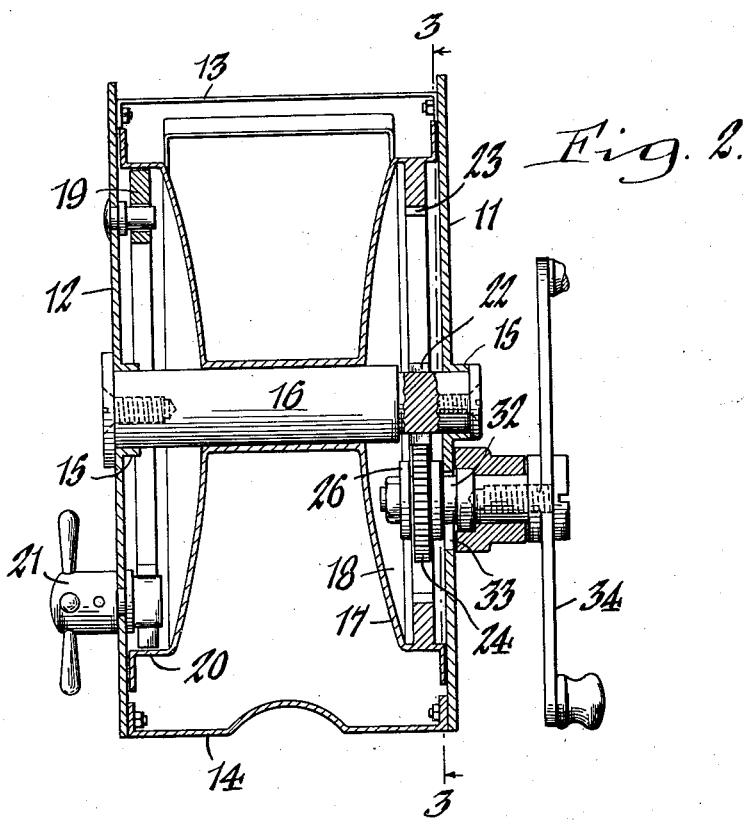

June 15, 1943.  C. KACHEL  2,321,820
FISHING REEL
Filed Aug. 30, 1941   2 Sheets-Sheet 2
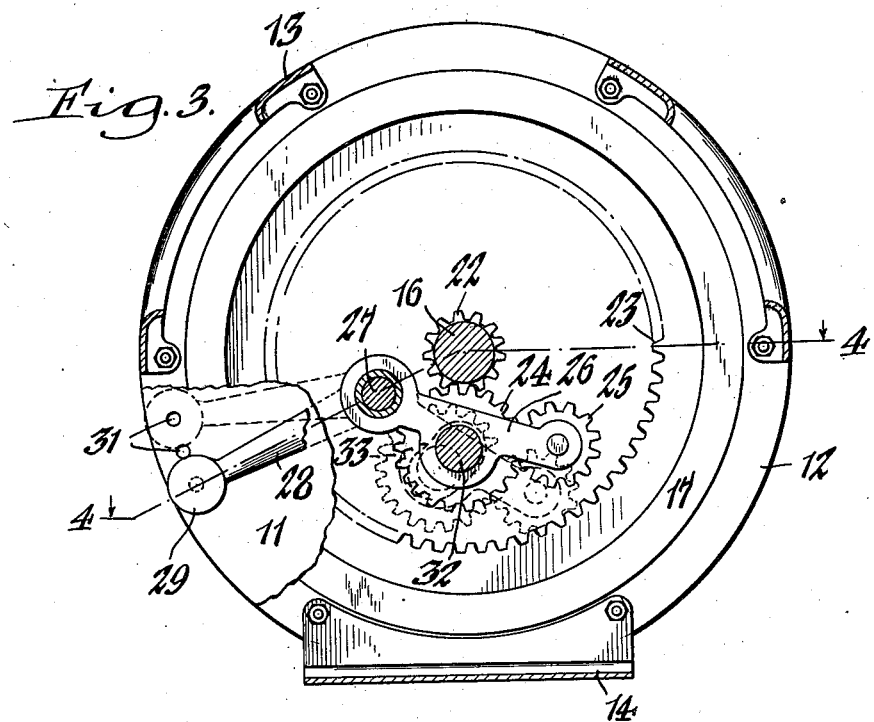
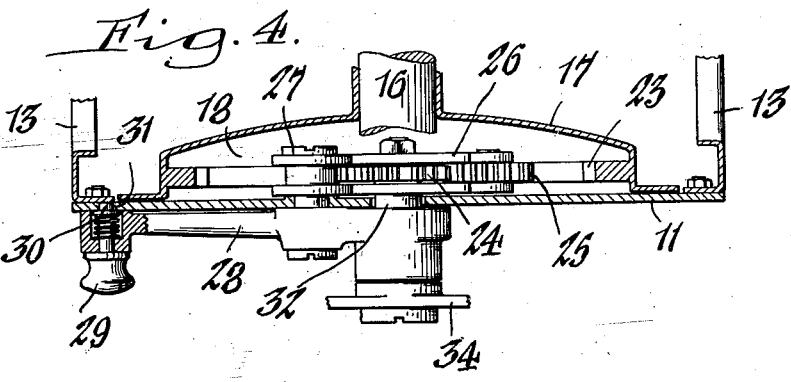
Inventor,
Charles Kachel,
by Walter P. Geyer
Attorney Patented June 15, 1943

2,321,820

UNITED STATES PATENT OFFICE 2,321,820

FISHING REEL

Charles Kachel, Williamsville, N. Y.

Application August 30, 1941, Serial No. 409,033

5 Claims. (Cl. 242—84.1)

This invention relates to certain new and useful improvements in fishing reels.

One of its objects is to provide a reel of this character which is designed for operation at different speeds and which can be readily set to operate at such different speeds in accordance with the wishes of the user while fishing.

Another object of the invention is to provide a multiple speed fishing reel which is simple, compact and inexpensive in construction, and which is reliable and efficient in operation.

A further object is to provide a high and low speed fishing reel having a speed changing mechanism which is designed to afford a ready shifting from one speed to the other.

Other features reside in the construction and arrangement of parts hereinafter described and particularly pointed out in the appended claims.

In the accompanying drawings:

Figure 1 is a side elevation of my multiple speed fishing reel, the same being mounted on a pole. Figure 2 is an enlarged transverse section thereof taken in the plane of line 2—2, Figure 1. Figure 3 is a vertical section taken substantially in the plane of line 3—3, Figure 2. Figure 4 is a horizontal section taken on line 4—4, Figure 3.

Similar characters of reference indicate corresponding parts throughout the several views.

By way of illustration, the reel is shown applied to a fishing pole 10, and in its preferred construction consists of a body composed of axially-spaced, circular side plates 11, 12 joined adjacent their peripheries by cross straps 13 and provided at its bottom with a bracket 14 for detachably connecting it to the pole. Journaled in bearings 15 formed centrally of these plates is a revolvable shaft 16 having a spool 17 fixed thereon for receiving the fish line. As shown in Figures 2 and 4, the side walls of this spool are dished inwardly or concave and are spaced somewhat from the companion side plates to provide compartments 18 in one of which the speed changing mechanism is disposed while in the other is arranged a suitable brake assembly. This brake assembly, for example, may consist of a contractible band 19 operatively engageable with a drum 20 formed on the spool 17, as shown in Figure 2, and regulated by a hand knob 21.

In its preferred construction shown in the drawings, the multi-speed mechanism comprises a high speed driven gear or pinion 22 fixed on the spool-shaft 16 and a low speed driven gear 23 in the form of a ring applied to the inner side of the spool and housed within the compartment 18. Both gears are in the same plane and disposed for relative displacement between them for selectively governing the speed of rotation to be imparted to the spool are driving pinions 24 and 25, respectively, the pinion 24 being movable into and out of meshing engagement with the spool-gear 22 and the companion pinion 25 being movable into and out of engagement with the spool ring-gear 23. These driving gears 24, 25 are journaled on a floating support consisting of a shiftable arm 26 pivoted at 27 to the reel-plate 11 to swing in a plane at right angles to the reel-axis, the smaller or low speed driving gear 25 being mounted on the free end of said arm while the larger or high speed driving gear 24 is mounted intermediate the ends of the arm, as shown in Figure 3. This arm is adapted to assume three different positions, firstly, a neutral position, wherein neither of its driving pinions is operative to transmit motion to the reel; secondly, a high speed position with its driving pinion 24 meshing with the spool-gear 22; and a low speed position with its other driving pinion 25 meshing with the ring gear 23. For shifting the speed-governing arm 26 to one or the other of its selective positions of adjustment, I provide its pivoted end with an actuating lever 28 having a manipulating knob or handle 29 to which is applied a spring-pressed latch or plunger 30 for releasable engagement with one or another of a series of pre-positioning openings 31 formed in the face of the reel-plate 11.

The pinion 24 constitutes the main reel-driving element and its supporting shaft 32, journaled in the shiftable arm 26, extends through an arcuate slot 33 in the plate 11, being provided at its outer end with an operating crank 34 for imparting rotation to the spool 17. When this crank is turned, motion is transmitted through the driving pinion 24 directly to the gear 22 or to the pinion 25 and thence to the ring gear 23, depending upon the position or setting of the speed-governing lever 28. In the neutral position of the latter, the pinions 24 and 25 are released from engagement with their companion gears 22 and 23, respectively.

While manifestly simple, compact and inexpensive in construction, this multi-speed reel can be quickly set at the speed desired.

I claim as my invention:

1. A fishing reel, comprising a body, a spool journaled thereon having high and low speed driven elements applied thereto, the high speed element consisting of a pinion applied to the spool-axis and the low speed element consisting of an internal ring gear extending inwardly from the periphery of the spool, a shiftable member mounted on said body for movement in a plane between said driven elements, and driving elements mounted on said shiftable member for engagement with the companion driven elements.

2. A fishing reel, comprising a body, a spool journaled thereon having high and low speed driven elements applied thereto, the high speed element consisting of a pinion applied to the spool-axis and the low speed element consisting of an internal ring gear extending inwardly from the periphery of the spool, a shiftable member mounted on said body for movement in a plane between said driven elements, and interconnected driving elements journaled on said shiftable member, one of the driving elements having an operating crank connected thereto and being engageable with the high speed driven element in one position of the shiftable member and the companion driving element being engageable with the low speed driven element in another position of the shiftable member.

3. A fishing reel, comprising a body, a spool journaled thereon having high and low speed driven elements applied thereto, the high speed element consisting of a pinion applied to the spool-axis and the low speed element consisting of an internal ring gear extending inwardly from the periphery of the spool, a shiftable member mounted on said body for movement in a plane between said driven elements, interconnected driving elements journaled on said shiftable member, one of the driving elements having an operating crank connected thereto and being engageable with the high speed driven element in one position of the shiftable member and the companion driving element being engageable with the low speed driven element in another position of the shiftable member, and means connected to said shiftable member for pre-setting and releasably retaining it in its speed-governing positions.

4. A fishing reel, comprising a body, a spool journaled thereon having concentrically-disposed, internally and externally-toothed driven elements applied thereto, an arm pivoted to said body for movement in a plane between said driven elements and having a pair of intermeshing driving elements journaled thereon, one of said driving elements being engageable with the externally-toothed driven element in one position of said arm and the companion driving element being engageable with the internally-toothed driven element in another position of said arm, an operating crank connected to one of said driving elements, and means connected to said pivoted arm for releasably retaining it in one or the other of its speed-governing positions.

5. A fishing reel, comprising a body, a spool journaled thereon having high and low speed external and internal gears applied thereto, an arm pivoted to said body for movement in a plane between said driven gears and having a pair of intermeshing driving elements journaled thereon, one of said driving elements being engageable with the high speed driven gear in one position of said arm and the companion driving element being engageable with the low speed driven gear in another position of said arm, said body having an opening in the side thereof and one of said driving elements having a shaft extending through said opening, an operating crank applied to the extended end of said shaft, an actuating lever operatively connected to said pivoted arm for shifting it to its speed-governing positions, and complementary means applied to said body and said lever for releasably retaining the latter in a set position.

CHARLES KACHEL.